(12) United States Patent
Vlietinck

(10) Patent No.: US 7,973,787 B2
(45) Date of Patent: Jul. 5, 2011

(54) METHOD FOR PICKING ON FUSED 3D VOLUME RENDERED IMAGES AND UPDATING VIEWS

(75) Inventor: Jan Vlietinck, Merelbeke (BE)

(73) Assignee: Agfa HealthCare NV, Mortsel (BG)

( * ) Notice: Subject to any disclaimer, the term of this patent is extended or adjusted under 35 U.S.C. 154(b) by 791 days.

(21) Appl. No.: 11/925,237

(22) Filed: Oct. 26, 2007

(65) Prior Publication Data

US 2008/0117211 A1 May 22, 2008

Related U.S. Application Data

(60) Provisional application No. 60/867,092, filed on Nov. 22, 2006.

(30) Foreign Application Priority Data

Nov. 20, 2006 (EP) .................................... 06124363

(51) Int. Cl.
G06T 15/00 (2006.01)
(52) U.S. Cl. .......... 345/419; 345/420; 345/424; 356/12; 382/285; 382/128; 382/154
(58) Field of Classification Search .................. 345/419, 345/420, 424; 382/42, 128, 154, 285; 356/12
See application file for complete search history.

(56) References Cited

U.S. PATENT DOCUMENTS

| | | | | |
|---|---|---|---|---|
| 6,510,244 B2 * | 1/2003 | Proesmans et al. | ............ | 382/203 |
| 6,618,054 B2 * | 9/2003 | Deering | ......................... | 345/581 |
| 7,250,936 B2 * | 7/2007 | Wilson et al. | ................. | 345/156 |
| 7,583,275 B2 * | 9/2009 | Neumann et al. | ............. | 345/633 |
| 7,742,629 B2 * | 6/2010 | Zarkh et al. | ................... | 382/128 |

OTHER PUBLICATIONS

Ferre, M., et al., "A framework for fusion methods and rendering techniques of multimodal volume data," Computer Animation and Virtual Worlds Archive, vol. 15, Issue 2, 36 pages, 2004.
Gasparakis, C., "Multi-resolution Multi-field Ray Tracing: A mathematical overview," Visualization '99. Proceedings San Francisco, CA. pp. 199-206, 1999.
Gobbetti, E., et al., "Interactive Virtual Angioscopy," Visualization '98. Proceedings Research Triangle Park, NC, pp. 435-438, 561, 1998.
Managuli, R., et al., "Multi-Volume Rendering for Three-Dimensional Power Doppler Imaging," IEEE Ultrasonics Symposium, pp. 2046-2049, 2005.
Penney, G., et al., "Validation of a two- to three-dimensional registration algorithm for aligning preoperative CT images and intraoperative fluoroscopy images," Medical Physics, vol. 28, No. 6, pp. 1024-1032, 2001.
Rössler, F., et al., "GPU-based Multi-Volume Rendering for the Visualization of Functional Brain Image,"SimVis, pp. 305-318, 2006.

* cited by examiner

Primary Examiner — Phu Nguyen
(74) Attorney, Agent, or Firm — Houston Eliseeva, LLP

(57) ABSTRACT

A method of point picking on a fused volume rendered view of multiple registered volumes having the following steps: selecting a rendered pixel, finding the projection ray through the rendered pixel, finding the intersection segment of the projection ray with the fused volume, traversing the intersection segment according to a traversing intersection point, calculating the intermediate fused volume rendered value at each traversing intersection point, evaluating a stop condition at each traversing intersection point leading to a final fused volume rendered value, outputting the coordinates of the traversing intersection point where the stop condition was reached as the picked point.

33 Claims, 1 Drawing Sheet

US 7,973,787 B2

METHOD FOR PICKING ON FUSED 3D VOLUME RENDERED IMAGES AND UPDATING VIEWS

RELATED APPLICATIONS

This application claims priority to European Patent Application No. EP06124363.0, filed on Nov. 20, 2006, and claims the benefit under 35 USC 119(e) of U.S. Provisional Application No. 60/867,092, filed on Nov. 22, 2006, both of which are incorporated herein by reference in their entirety.

BACKGROUND OF THE INVENTION

The need for examining the internal organs of patients in a non-invasive way led to the invention of several volumetric scanning modalities like magnetic resonance (MR), computed tomography (CT), and positron emission tomography (PET) imaging. The associated scanners produce large volumetric data sets of a physical property measured on a fine volumetric grid superimposed on the subject under study.

The diverse scanning modalities produce data sets that reveal diagnostic information according to different measured physical properties. Thus, each scanning modality is suitable for a particular examination. CT scanners are more suitable to visualize the boundary between anatomical parts having a different density like for example bone versus soft tissue. MR scanners are better in differentiating soft tissue because of the differentiation of tissue according to bonding with the hydrogen atom. PET scanners measure metabolic activity making them suitable to detect early stage cancer. Besides the measured physical property, the measuring resolution of the scanners differ widely, CT being high resolution, MR being medium resolution, and PET being relatively low resolution.

Sometimes the information revealed by one particular scanner is not enough for accurate diagnosis or surgical intervention. In these cases, the patient needs to be scanned by multiple scanning modalities. With these multiple scanned volume data sets for each location in the scanned part of the patient, there are now multiple measured values to be considered. The combination of the multiple measured values enables a more accurate diagnosis or more accurate planning for surgical intervention. It is common to combine PET and CT volumes to enable better treatment of cancer.

Another instance of combined usage of multiple volume data sets occurs in follow up studies for the evaluation of the evolution of a particular illness or comparing the pre- and post-operative situation. In this case volume data sets of scanning results at different instances of time from the same or different scanning modalities will be combined.

Once the multiple volume datasets are available the examiner or physician wants to visualize the multiple volumes as one fused volume. The fused volume will appear to the examiner as one scanned volume with multiple measured values per volume grid intersection. To distinguish between the multiple measured values, often they are given a different color. A fusion operation may mix the multiple colors according to a blending operator and variable fusion weights. This enables the examiner to visualize any of the multiple volumes separately or in any fused combination.

As the measurement grids of the multiple volume data sets may differ in resolution and orientation they need to be registered. A registration process will ensure that the measurement grids of the multiple volumes are scaled and rotated so that they map to the same locations in the patient. Rigid registration consists of scaling and rotation of the multiple data sets. Non rigid registration also takes into account possible deformations of the patient. When the body shape is different at each instance of scanning, non-rigid registration is required for correctly mapping the measurement grids to the same locations in the patient.

Previously volumetric data sets could only be examined in a two-dimensional (2D) fashion by scrolling through a stack of slices. Each of the slices represents an intersection image of the patient with a virtual cutting plane. In order to examine the volumetric data sets directly in 3D, volume rendering methods have been invented displaying the volume in a three-dimensional (3D) representation. Those methods include direct volume rendering (DVR), maximum intensity projection (MIP), minimum intensity projection (MinIP), average intensity projection, digital radiography reconstruction (DRR), double contrast barium enema simulation (DCBE). Those volume rendering methods enable the examiner to rotate, zoom and pan the volumetric data set in 3D.

With fused volume rendering it becomes possible to visualize multiple registered volume data sets as one fused volume in 3D. Often the examiner wants to select a particular pixel of the fused 3D volume rendered image and perform an action on the corresponding 3D position in the patient. Finding the corresponding 3D position related to a rendered pixel is called picking. Desired picking actions may include re-centering other displayed views around the picked 3D position, adding 3D annotations to the picked 3D position including measurements and markers, starting a segmentation operation with the picked 3D position as a seed point.

Given that each pixel is the result of a fusion operation between multiple registered volume rendered images makes it not obvious how to find the picked 3D position.

Until now picking on volume rendered images was limited to single volume based volume rendering. In case of multiple volumes based fused volume rendering, no methods are known in prior art to perform picking.

Several ways of volume fusion are described in literature.

Publication [1]: "A framework for fusion methods and rendering techniques of multimodal volume data" by Maria Ferre, Anna Puig and Dani Tost; Computer Animation and Virtual Worlds Archive, Vol. 15, Issue 2 (May 2004) describes various ways of applying the fusion at all stages of the fused volume rendering pipeline. The fusion is performed by a weighted average of calculated properties at the different pipeline stages. The weights can be fixed or data range dependent.

Publication [2]: "Multi-Volume Rendering for Three-dimensional Power Doppler Imaging", Ravi Managuli, Yang Mo Yoo, Yongmin Kim, IEEE Ultrasonics Symposium, 2005 describes similar fusion techniques and distinguishes between composite and post fusion, similar to the material/shading fusion and color fusion of publication [1]. The composite fusion however does make a data dependent selection of voxels from one of the two volumes instead of weighting.

Publication [3]: "GPU-based multi-volume rendering for the visualization of functional brain image", F. Rössler, Eduardo Tejada, Thomas Fangmeier, Thomas Ertl, Markus Knauff; SimVis 2006 (305-318) describes an interleaved slice compositing volume fusion technique suitable for execution on GPUs, similar to material/shading fusion of [1], no weighting is done.

SUMMARY OF THE INVENTION

Not all of the above fusion methods are suitable for picking. Post rendering fusion renders the volumes separately and fuses the rendered images afterwards. With this technique fused picking is undefined. Picking could be performed on the n separate rendered volumes resulting in n picking results, but it is not possible to combine these n picking results to one picked point that visually makes sense. To work around this, prior art limits fused picking to one of the volumes used for the fusion. Publication [4]: "Interactive Virtual Angioscopy", Gobbetti E et al., Proceedings IEEE Visualization, pages 435-438, IEEE Computer Society Press, October 1998 describes an implementation of single volume picking.

The present invention relates to the visualization of regular grid volume sets, like those that are generated by medical scanners such as MR, CT, PET.

More specifically the invention relates to fused 3D volume rendering of multiple volumes.

It is an aspect of the present invention to provide a method of picking on fused volume rendering images of multiple volumes.

It is another aspect of this invention to update other simultaneously displayed views of the separate or fused volumes according to a picking action depending on the picked point.

In general, according to one aspect, the invention features, a method of weighted point picking on a pre-compositing fusion volume rendered image of multiple registered volumes. The method comprises the steps of selecting a rendered pixel, finding the projection ray through the rendered pixel, and finding the intersection segment of the projection ray with the fused volume. The intersection segment is traversed according to a traversing intersection point. Volume samples for each of the volumes are looked up at the traversing intersection point and an optional transfer function is applied along with shading on the volume samples. The method further includes performing a weighted fusion operation between the volume samples, compositing the fusion result with the previous fusion results, and evaluating a result condition at each traversing intersection point leading to a final compositing result. The coordinates of the traversing intersection point are output where the result condition was reached as the picked point.

The method of the present invention is commonly implemented as a computer program adapted to carry out the steps of the method.

The computer program is generally stored on a computer readable carrier medium.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
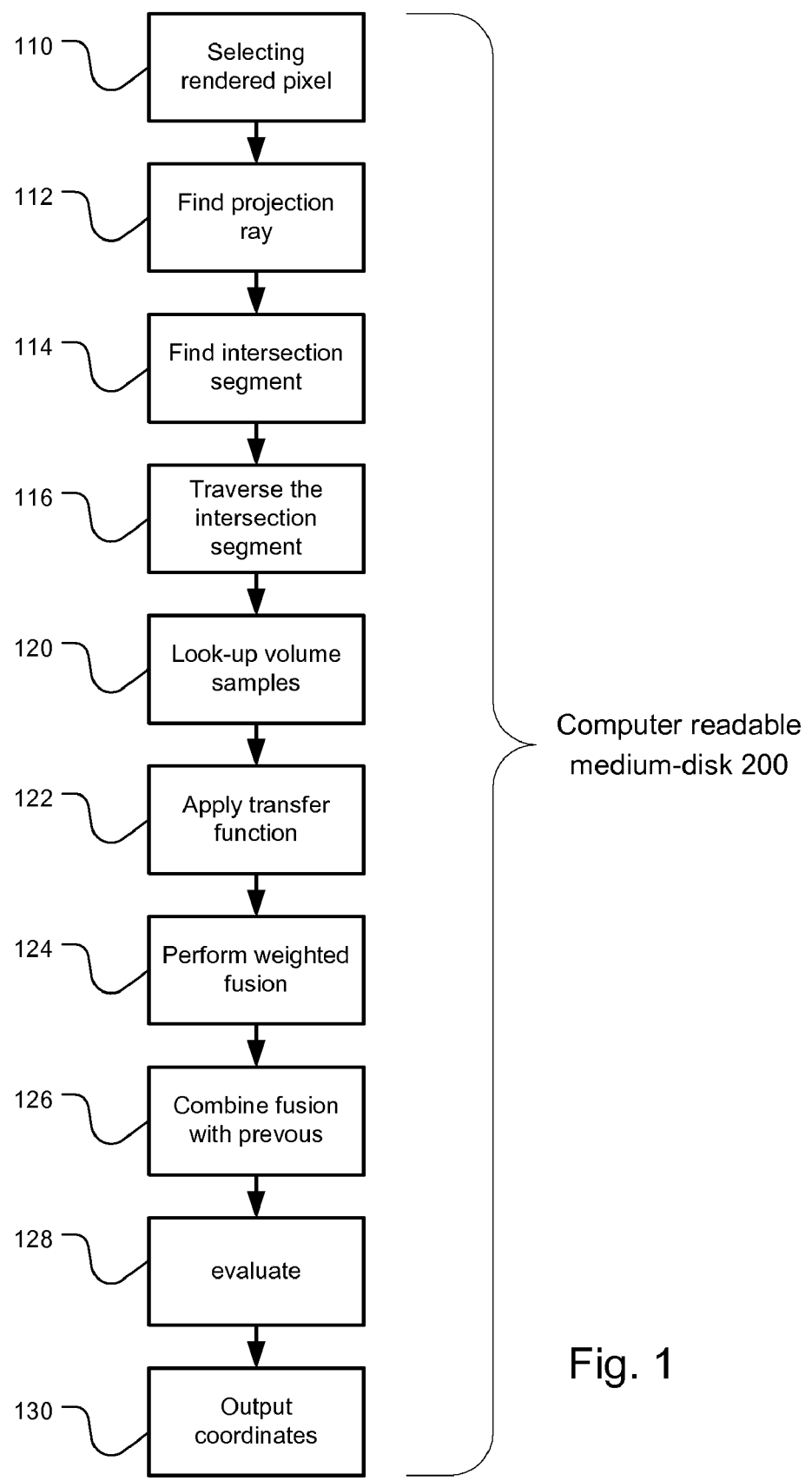
FIG. 1 is a flow diagram illustrating a method for weighted point picking on a pre-compositing fusion volume-rendered image of multiple registered volumes.

FIG. 1 shows a method for weighted point picking on a pre-compositing fusion volume-rendered image of multiple registered volumes according to the principles of the present invention.

Generally, the method comprises the steps of:
selecting a rendered pixel, step 110;
finding the projection ray through the rendered pixel, step 112;
finding the intersection segment of the projection ray with the fused volume, step 114;
traversing the intersection segment according to a traversing intersection point, step 116;
looking-up volume samples for each of the volumes at the traversing intersection point, step 120;
applying optional transfer function and shading on the volume samples, step 122;
performing a weighted fusion operation between the volume samples, step 124;
compositing the fusion result with the previous fusion results, step 126;
evaluating a result condition at each traversing intersection point leading to a final compositing result, step 128;
outputting the coordinates of the traversing intersection point where the result condition was reached as the picked point. step 130;

In the preferred embodiment, the fusion weights are interactively changed and influence the picked result. Because of the pre-compositing fusion (fusion before compositing), the picked point will naturally correspond to how the user would intuitively correlate the rendered selected pixel to a point in 3D. When a volume has a small weight factor, weighted fusion picking will tend to select 3D points on the volumes with a stronger weight, and thus higher visibility, unless the density of the former is high and low for the latter at the intersection ray segment at the selected rendered pixel.

The presently described fused picking can be applied to either volume rendering, maximum intensity projection (MIP) or minimum intensity projection (MinIP).

For volume rendering the compositing formulae are changed to iteratively front to back integration of the volume rendering line integral. The result condition is reached when the composited opacity value exceeds a certain value, such as typically 95%.

For MIP or MinIP the compositing formulae are changed to calculating the maximum or minimum between the calculated fused value and the previously computed compositing value. The result condition is met at the traversing intersection point where the fused result reached the maximum or minimum value.

In one embodiment other simultaneously displayed views of the separate or fused volumes are updated according to a picking action depending on the picked point. The picking action initiates a re-centering of the views around the picked point, in one implementation.

In an alternative embodiment the picking action is the addition of 3D annotations such as 3D markers and 3D measurements with the picked point being a reference point.

In still an alternative embodiment the picking action is segmentation with the picked point being a seed point.

The other displayed views may include MPR.

The other displayed views comprise 3D volume rendered views including external 3D viewing, endoscopic 3D viewing, volume of interest viewing, thick MPR etc, in some examples.

The volume rendering method in all of these cases comprises one of direct volume rendering, maximum intensity projection (MIP), minimum intensity projection MinIP, average intensity projection, digital radiography reconstruction (DRR), double contrast barium enema simulation (DCBE).

The other displayed views may comprise rendering of segmentation results and rendering of 3d annotations.

Typically the method is implemented as a computer program adapted to carry out the steps of the method. The computer program is generally stored on a computer readable carrier medium, such as disk 200.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method performed by a computer system for weighted point picking on a pre-compositing fusion volume rendered image of multiple registered volumes, the method comprising:
   selecting a rendered pixel,
   finding a projection ray through the rendered pixel,
   finding an intersection segment of the projection ray with a fused volume,
   traversing the intersection segment according to a traversing intersection point,
   looking-up volume samples for each of the multiple registered volumes at the traversing intersection point,
   performing a weighted fusion operation between the volume samples of the multiple registered volumes to calculate a fusion result,
   compositing the fusion result with previous fusion results,
   evaluating a result condition at each traversing intersection point leading to a final compositing result, and
   outputting coordinates of the traversing intersection point where a result condition is reached as a picked point.

2. A method according to claim 1, wherein weight values are interactively changed to influence the volume fusion and the picked point.

3. A method according to claim 1 wherein the compositing includes volume rendering and the result condition is exceeding a composited opacity value.

4. A method according to claim 3, wherein the composited opacity value is greater than 95%.

5. A method according to claim 1 wherein the compositing includes maximum intensity projection (MIP) or minimum intensity projection (MinIP), and the result condition is reaching a maximum or minimum composited value.

6. A method according to claim 1 wherein other simultaneously displayed views of separate or fused volumes are updated according to a picking action depending on the picked point.

7. A method according to claim 6 wherein the picking action includes re-centering the views around the picked point.

8. A method according to claim 6 wherein the picking action is the addition of 3D annotations including 3D markers and 3D measurements with the picked point being a reference point.

9. A method according to claim 6 wherein the picking action is segmentation with the picked point being a seed point.

10. A method according to claim 6 wherein the other displayed views include MPR.

11. A method according to claim 6 wherein the other displayed views include 3D volume rendered views including external 3D viewing.

12. A method according to claim 6 wherein the other displayed views include 3D volume rendered views including endoscopic 3D viewing.

13. A method according to claim 6 wherein the other displayed views include 3D volume rendered views including volume of interest viewing.

14. A method according to claim 6 wherein the other displayed views include 3D volume rendered views including thick MPR.

15. A method according to claim 6 wherein the other displayed views include rendering of segmentation results and rendering of 3D annotations.

16. A method according to claim 1 further comprising volume rendering by direct volume rendering.

17. A method according to claim 1 further comprising volume rendering by maximum intensity projection (MIP).

18. A method according to claim 1 further comprising volume rendering by minimum intensity projection MinIP.

19. A method according to claim 1 further comprising volume rendering by average intensity projection.

20. A method according to claim 1 further comprising volume rendering by digital radiography reconstruction (DRR).

21. A method according to claim 1 further comprising volume rendering by double contrast barium enema simulation (DCBE).

22. A method according to claim 1, further comprising applying a transfer function and shading on the volume samples.

23. A method according to claim 1, wherein the multiple registered volumes are generated from multiple different imaging modalities.

24. A method according to claim 23, wherein the imaging modalities are MRI, PET, and/or CT scanners.

25. A method according to claim 24, wherein at least two different imaging modalities are combined to create a single fused volume.

26. A computer software program stored in a computer-readable non-transitory medium for weighted point picking on a pre-compositing fusion volume rendered image of multiple registered volumes, which software program, when read by a computer, causes the computer to:
   select a rendered pixel,
   find a projection ray through the rendered pixel,
   find an intersection segment of the projection ray with a fused volume,
   traverse the intersection segment according to a traversing intersection point,
   look-up volume samples for each of the multiple registered volumes at the traversing intersection point,
   perform a weighted fusion operation between the volume samples of the multiple registered volumes to calculate a fusion result,
   composite the fusion result with previous fusion results,
   evaluate a result condition at each traversing intersection point leading to a final compositing result, and
   output coordinates of the traversing intersection point where a result condition is reached as the picked point.

27. A computer software program according to claim 26, wherein the multiple registered volumes are combined from multiple different imaging modalities.

28. A computer software program according to claim 27, wherein the imaging modalities are MRI, PET, and/or CT scanners.

29. A computer software program according to claim 28, wherein at least two different imaging modalities are combined to create a single fused volume.

30. A computer software product for weighted point picking on a pre-compositing fusion volume rendered image of multiple registered volumes, the product comprising a non-transitory computer-readable medium in which program instructions are stored, which instructions, when read by a computer, cause the computer to:

select a rendered pixel, find a projection ray through the rendered pixel, find an intersection segment of the projection ray with a fused volume, traverse the intersection segment according to a traversing intersection point, look-up volume samples for each of the multiple registered volumes at the traversing intersection point, perform a weighted fusion operation between the volume samples of the multiple registered volumes to calculate a fusion result, composite the fusion result with previous fusion results, evaluate a result condition at each traversing intersection point leading to a final compositing result, and output coordinates of the traversing intersection point where a result condition is reached as a picked point.

31. A computer software product according to claim 30, wherein the multiple registered volumes are combined from multiple different imaging modalities.

32. A computer software product according to claim 31, wherein the imaging modalities are MRI, PET, and/or CT scanners.

33. A computer software product according to claim 32, wherein at least two different imaging modalities are combined to create a single fused volume.

\* \* \* \* \*